United States Patent
Kim et al.

(10) Patent No.: US 8,332,744 B2
(45) Date of Patent: Dec. 11, 2012

(54) TRANSLATION OF DOCUMENTS

(75) Inventors: Hyonsu Kim, Tokyo (JP); Yoshiroh Kamiyama, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 1311 days.

(21) Appl. No.: 11/863,423

(22) Filed: Sep. 28, 2007

(65) Prior Publication Data

US 2008/0028305 A1   Jan. 31, 2008

Related U.S. Application Data

(62) Division of application No. 10/374,838, filed on Feb. 26, 2003, now Pat. No. 7,512,712.

(30) Foreign Application Priority Data

Feb. 28, 2002   (JP) .................................. 2002-054663

(51) Int. Cl.
   *G06F 17/00*   (2006.01)
(52) U.S. Cl. ........................................ 715/234; 715/264
(58) Field of Classification Search .................. 715/200, 715/234, 264
   See application file for complete search history.

(56) References Cited

U.S. PATENT DOCUMENTS

| | | | |
|---|---|---|---|
| 5,963,966 A | 10/1999 | Mitchell et al. | |
| 6,119,078 A * | 9/2000 | Kobayakawa et al. | 704/3 |
| 6,311,197 B2 * | 10/2001 | Mighdoll et al. | 715/201 |
| 6,330,529 B1 | 12/2001 | Ito | |
| 6,336,124 B1 | 1/2002 | Alam et al. | |
| 6,347,316 B1 * | 2/2002 | Redpath | 1/1 |
| 6,598,048 B2 * | 7/2003 | Carneal et al. | 1/1 |
| 6,604,101 B1 * | 8/2003 | Chan et al. | 707/706 |
| 6,678,738 B2 | 1/2004 | Haverstock et al. | |
| 6,710,787 B1 * | 3/2004 | Eves et al. | 715/764 |
| 6,741,986 B2 | 5/2004 | Cho et al. | |
| 6,742,161 B1 | 5/2004 | James et al. | |
| 6,772,160 B2 | 8/2004 | Cho et al. | |
| 6,823,311 B2 | 11/2004 | Tetsumoto | |
| 7,353,268 B2 * | 4/2008 | Miyahira | 709/224 |
| 7,512,532 B2 * | 3/2009 | Kimpara | 704/3 |
| 2002/0077805 A1 | 6/2002 | Hecht et al. | |
| 2005/0022115 A1 | 1/2005 | Baumgartner et al. | |

FOREIGN PATENT DOCUMENTS

JP   2001216303   8/2001

* cited by examiner

*Primary Examiner* — Manglesh M Patel

(74) *Attorney, Agent, or Firm* — Cuenot, Forsythe & Kim, LLC

(57) ABSTRACT

A translation method reduces the time required for display of the translation of a web page. Based on a translation request, a translation service server requests a translation engine translate an HTML document. The translation service server also extracts image tags from the HTML, and transmits the dummy tags to the browser based on the image tags. The browser requests image data based on the image tags, and obtains image data. The translation service server receives the translation from the translation engine, and transmits it to the browser.

11 Claims, 5 Drawing Sheets

```
<HTML>
<BODY>
<IMG src="image_1.gif" width=0 height=0onLoad="document.body.removeChild(this)">
<IMG src="image_2.gif" width=0 height=0onLoad="document.body.removeChild(this)">
<H1>私のHPへようこそ</H1>
<IMG src="image_1.gif">
<P>これは私の写真です。</P>
<IMG src="image_2.gif">
<P>このホームページは................................................................
.................................................................................................
.................................................................................................
.................................................................................................
.................................................................................................
............................................................。ありがとう！</P>
</BODY>
</HTML>
```

```
        ┌─ ┌ 74 ┌ <HTML>
        │  │    │ <BODY>
(i) ─┤  │ 75 { <IMG src="image_1.gif" width=0 height=0>
        │  │ 76 { <IMG src="image_2.gif" width=0 height=0>
        └─ └    └ ─────────────────────────────────────────
              <H1>私のHPへようこそ</H1>
        ┌─ 72 { <IMG src="image_1.gif">
        │      <P>これは私の写真です。</P>
        │  73 { <IMG src="image_2.gif">
(ii) ─┤      <P>このホームページは............................
        │      ............................................
        │      ............................................
        │      ............................................
        │      ......................。 ありがとう !</P>
        │      </BODY>
        └─     </HTML>
```

```
<HTML>
<BODY>
```
78{ `<IMG src="image_1.gif" width=0 height=0onLoad="document.body.removeChild(this)">`
79{ `<IMG src="image_2.gif" width=0 height=0onLoad="document.body.removeChild(this)">`
```
<H1>私のHPへようこそ</H1>
<IMG src="image_1.gif">
<P>これは私の写真です。</P>
<IMG src="image_2.gif">
<P>このホームページは..................................................................
........................................................................................
........................................................................................
........................................................................................
........................................................................................
............................................................。ありがとう!</P>
</BODY>
</HTML>
```

FIG. 7

TRANSLATION OF DOCUMENTS

This application is a divisional of application Ser. No. 10/374,838, filed Feb. 26, 2003, now U.S. Pat. No. 7,512,712, which is herein incorporated by reference.

FIELD OF THE INVENTION

The present invention relates to a computer that can reduce the time required for display of translation results.

BACKGROUND OF THE INVENTION

A variety of information is conventionally obtainable across national boundaries. Especially recently, a user can easily obtain information, such as an HTML document, by employing a client on a network, the Internet, for example, to access a server. The user can then display and browse the HTML document by employing a WWW browser application (hereinafter referred to simply as a browser) executed by the client. However, frequently the text in an HTML document, which may also contain images, is in English or a local, information source language the user can not read. The user must then employ a machine to translate the text into his or her native language and must read the translation to acquire the information in the document.

This translation process can be implemented by executing a translation program installed in the computer of the user, or by using a translation service provided by a predetermined server connected to the Internet. For the translation process performed by the server, for example, the client transmits the URL (Uniform Resource Locator) of a web page to be translated across the Internet to a predetermined server. The server then obtains the HTML document for the URL and translates the text. The obtained translation results are displayed, as is the web page in the pre-translation state indicated for the original URL, i.e., the translated web page text and included images are displayed. As is described above, for the translation process for which the server is used, a special program, such as translation software, is not needed for the client employed by the user, and the translation of the web page can be easily obtained.

However, since a predetermined length of time is required for the translation process, the user must wait a specific time period before he or she can obtain the translation results. For the translation of a web page, for example, a user must wait a comparatively long period of time before an HTML document, which is the result of the translation, is displayed in web page form on the client's browser. When image data, such as photos, charts and pictures, is included in the web page, waiting time is even greater.

SUMMARY OF THE INVENTION

To resolve this technical problem, the object of the present invention is to provide a computer that can display translation results within a relatively shorter period of time, a server therefor, and a translation method and program.

To achieve these objectives, and to display on a browser the translation results for the HTML document, the present inventors focused on the fact that the translated HTML document is not displayed on the browser immediately after it is received from the server. The reason for this is that if image tags are included in the translated HTML document, the image data based on the image tags is obtained before the translated HTML document is displayed. Therefore, for the acquisition of the translation results, the present invention provides a method whereby translation results can be displayed faster by providing means for obtaining necessary data, such as image data, in advance.

According to this invention, for a computer connectable to a network, an acquisition unit obtains document data across the network; an extraction unit extracts from the document data instruction data instructing the acquisition of predetermined data stored separately from the document data; a translation acquisition unit translates the document data to obtain translation data; and before the translation acquisition unit completes the acquisition of the translation data, an instruction unit instructs the start of the acquisition of the predetermined data designated by the instruction data. Since this computer can, for example, instruct the acquisition of the predetermined data before the acquisition of translation data has been completed, the predetermined data can be obtained during a waiting period preceding the acquisition of all the translation data.

The predetermined data is, for example, image data. This computer further comprises: a display unit for displaying a translation based on the translation data and an image based on image data, wherein the display unit can inhibit the image display until the translation data is obtained.

Further, the invention can be implemented as a server connected to a network. For this server, an electronic data acquisition unit obtains electronic data, including text data and image acquisition data; a data extraction unit extracts from the electronic data the image acquisition data as data (prior acquisition data) for acquiring images first; a translated text data acquisition unit translates the text data in the electronic data and obtains translated text data; and a display data generator generates display data based on the prior acquisition data and the translated electronic data, including the translated text data and the image acquisition data.

For this server, a transmitter transmits to a client, across a network, the generated display data in the prior acquisition data and the translated electronic data order. In this case, it is preferable that the extracted, prior acquisition data be transmitted to the client before the translated text data acquisition unit obtains the translated text data. Further, the display data generator can also add, to the display data, storage instruction data for storing, in the client, image data obtained according to the prior acquisition data.

The invention can also be implemented as a translation method. This translation method comprises the steps of:

obtaining original document display data to display an original document on a computer;

employing the original document display data to examine the presence of saved data that is saved as data differing from the original document display data;

when the saved data is present, generating instruction data for instructing the acquisition of the saved data, and transmitting the instruction data to a client across network;

obtaining translation data for the original document; and transmitting the obtained translation data to the client across the network.

According to this translation method, before the presence of the saved data is examined, the acquisition for the translation data of the original document can be instructed.

Further, it is preferable that the instruction and the translation data be transmitted to the client as a coupled document data series.

According to this translation method, the client is permitted to initiate the acquisition of the saved data in accordance with the instruction data, before the translation data is acquired. In this case, based on the instruction data, the saved data can be stored in a storage device in the client.

BRIEF DESCRIPTION OF THE DRAWINGS

For a more complete understanding of the present invention and for further advantages thereof, reference is now made to the following Detailed Description taken in conjunction with the accompanying drawings, in which:

FIG. 5 is a diagram showing example results for an HTML document;

FIG. 6 is a diagram showing a web page based on the results HTML document in FIG. 5; and FIG. 7 is a diagram showing an HTML document including example dummy tags for removing blank lines from a web page that is based on the results HTML document.

DETAILED DESCRIPTION OF THE INVENTION

Figure 1:
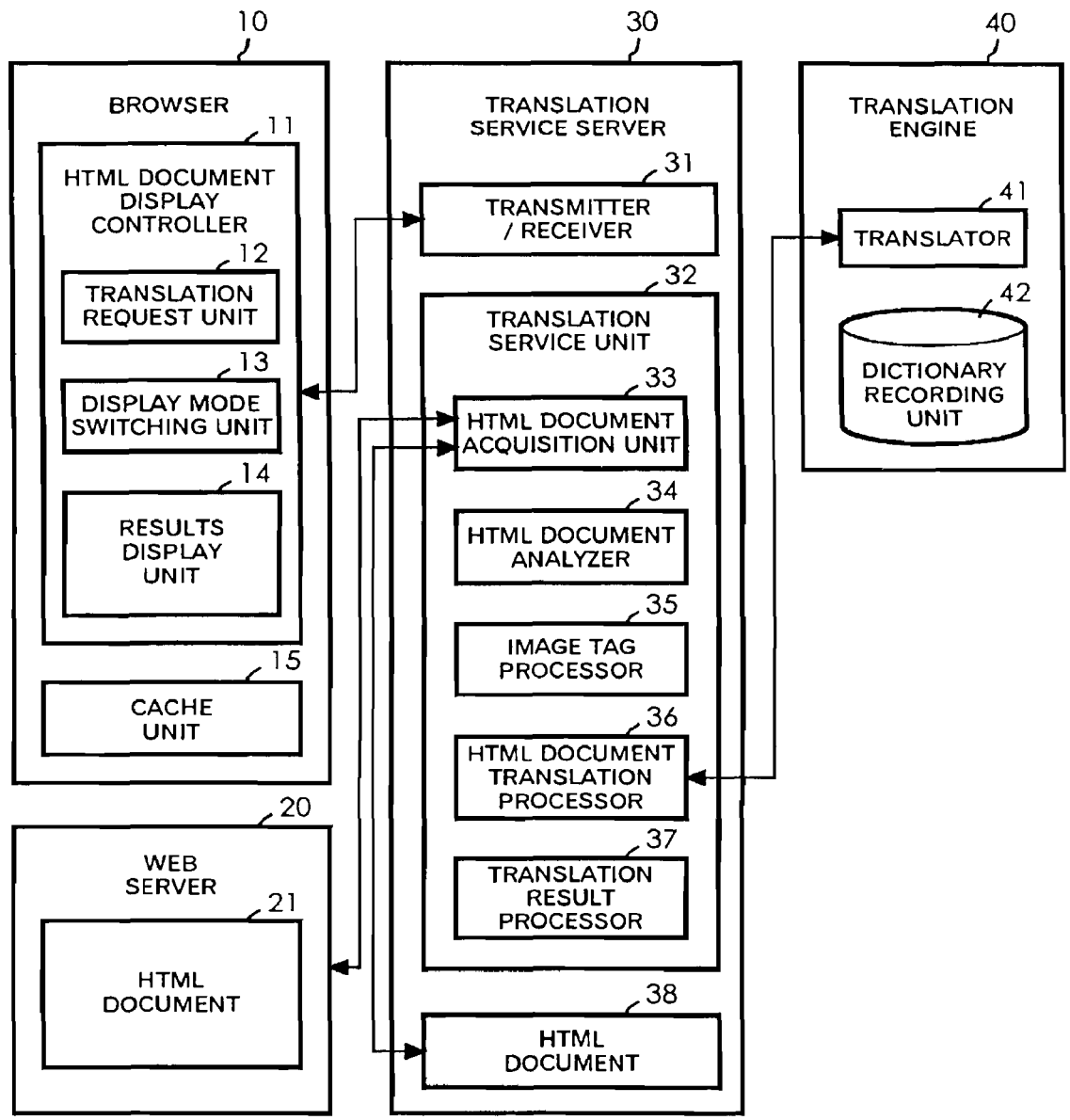
FIG. 1 is a diagram for explaining the functional configuration of a translation system according to the preferred embodiment of the present invention.

FIG. 1 is a diagram explaining the functional configuration of a translation system according to this embodiment. The translation system in FIG. 1 comprises: a WWW browser system (hereinafter referred to as a browser) 10 for displaying an HTML document (electronic data and original document display data) for a user; a web server 20 that accumulates HTML documents; a translation service server (computer) 30 for providing a translation service upon receiving a request from the browser 10; and a translation engine 40 for translating an HTML document upon receiving a request from the translation service 30, all of which are connected across a network, such as the Internet. The translation service server 30 and the translation engine 40 may be on the same computer.

For a user's (client) computer, the browser 10 is implemented when a CPU interacts with the main memory to perform processes based on a program stored on an HDD. In accordance with the HTML protocol and based on the URL designated by the user, the browser 10 downloads the data for an HTML document from a predetermined server and analyzes the data. The browser 10 includes an HTML document display controller 11 for displaying an analyzed HTML document on a display device, and a cache unit 15 for storing, on a disk or in a memory, the data for the HTML document obtained by the computer.

The HTML document display controller 11 of the browser 10 includes a translation request unit 12 for accepting the URL for a web page that a user desires to translate, and for issuing a translation request; a display mode switching unit 13 for setting a display mode for a later obtained translation; and a results display unit 14 for displaying a translated HTML document. These functions of the HTML document display controller 11 are implemented by downloading from the translation service server an HTML document for displaying a translation service HTML web page, which will be described later, and by displaying the obtained HTML document.

The web server 20 stores an HTML document 21 on a disk, such as an HDD, or in a memory. The web server 20 can accept a request received across the Internet for browsing the HTML document 21, and can transmit the HTML document 21 in accordance with this request.

The translation service server 30 includes a transmitter/receiver 31 for exchanging data with the browser 10 of the client, and a translation service unit 32 for providing a translation service. The functions of the transmitter/receiver 31 and the translation service unit 32 are implemented when a CPU executes a program stored on a disk, such as an HDD, or in the memory of the translation service server 30.

The translation service unit 32 of the translation service server 30 includes: an HTML document acquisition unit 33 for obtaining from the web server 20 the HTML document 21 at the URL designated in the translation request; an HTML document analyzer (an extraction unit and a prior acquisition data extraction unit) 34 for extracting tag information, such as image tags (instruction data and image acquisition data), included in the HTML document 21; an image tag processor (instruction unit) 35 for generating a dummy tag (prior acquisition data and instruction data), based on the image tags, and for adding the dummy tag to a results HTML results document (a display HTML document) for displaying the results; an HTML document translation processor (a translation acquisition unit and a translated text data acquisition unit) 36 for transmitting a request to the translation engine 40 for the translation of the text portions of the HTML document 21, and for obtaining the obtained translation; and a translation results processor (display data generator) 37 for processing the translation received from the translation engine 40 and for completing a results HTML document.

The translation service server 30 stores, in a storage device, an HTML document 38 that is the equivalent of the HTML document 21 of the web server 20. For example, when the URL designated in the translation request issued by the browser 10 designates the HTML document 38, which is the equivalent of the document 21, the translation service unit 32 obtains the HTML document 38 and translates it.

The translation engine 40 includes: a translator 41 for translating from the language of a designated original document (hereinafter referred to as the original language) into a desired language the text portions of an HTML document received from the translation service server 30; and a dictionary recording unit 42, which stores data for words and grammar rules referred during a translation. The translator 41 performs the translation process when a CPU performs a program stored on a disk, such as an HDD, or in the memory of the translation engine 40.

In a translation system having this configuration, the translation service server 30, upon receiving a translation request from the browser 10, obtains the HTML, web page document at the URL designated in the request, and the translation engine 40 translates the HTML document.

At this time, however, while the translation service server 30 transmits the HTML document text portions to the translation engine 40, it extracts an image tag or tags from the HTML document and transmits them to the browser 10. Subsequently, to display the translated web page, the translation service server 30 obtains the translation of the text portions from the translation engine 40 and transmits it to the browser 10 as an HTML document.

Upon receiving the HTML document, the browser 10, which initially received the image tag or tags and obtained and stored image data for a web page to be browsed, performs a parallel reception process for which it can employ the previously stored image data. As a result, image data for the HTML document need not be obtained from an outside network device, and the translated web page can be displayed within a short period of time.

Figure 2:
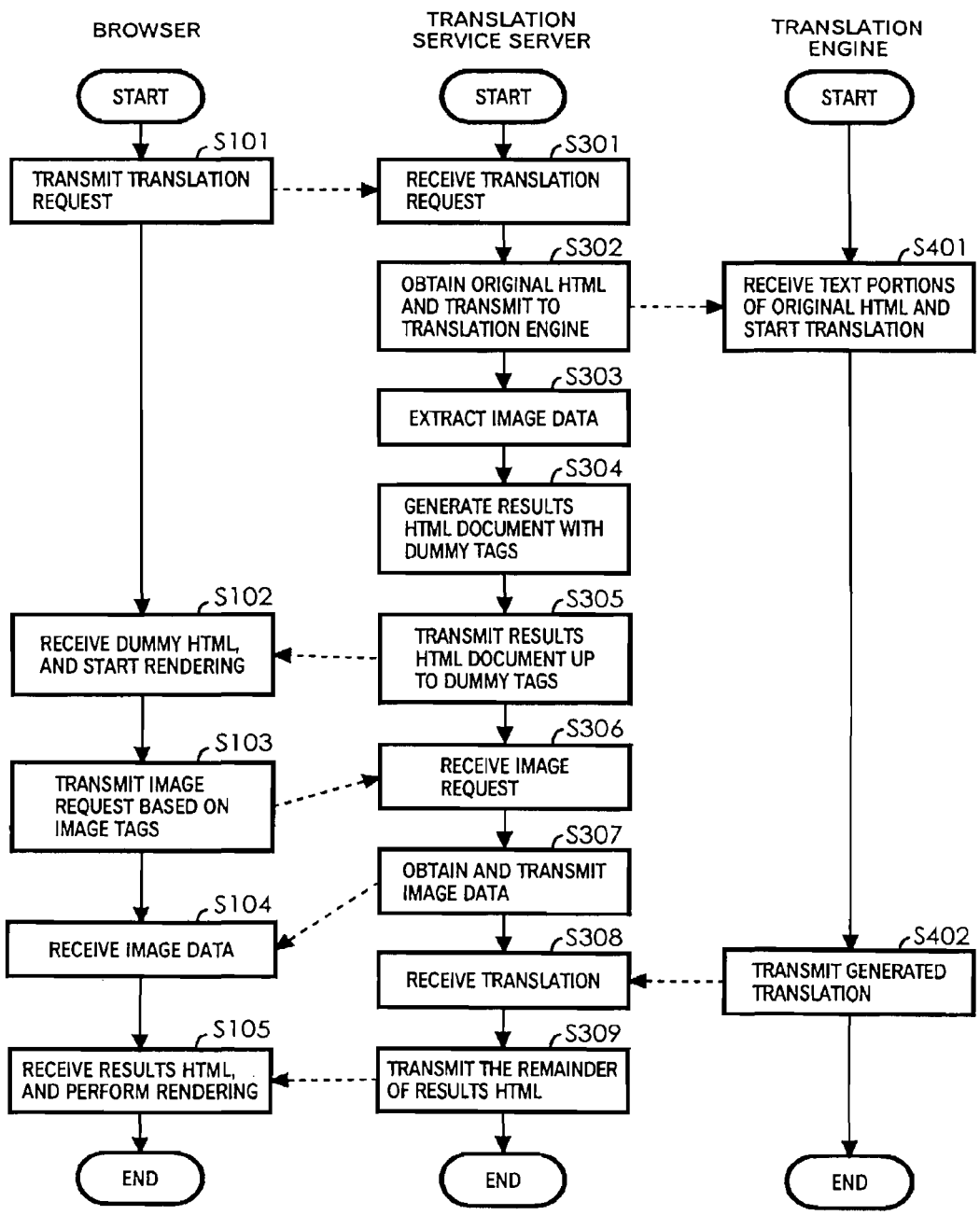
FIG. 2 is a flowchart for explaining the processing performed by a browser, a translation service server and a translation engine.

A specific description of the processing performed by the translation system will now be presented. FIG. 2 is a flowchart for explaining the processing performed by the browser 10, the translation service server 30 and the translation engine 40.

First, the browser 10 transmits to the translation service server 30 a translation request and the URL of a web page designated for translation by the translation request unit 12 (step S101). Specifically, the translation request unit 12 of the browser 10 designates the URL of a web page entered by a user at an input device, such as a keyboard connected to a computer, and transmits the URL to the transmitter/receiver 31 of the translation service server 30.

Figures 3, 4:
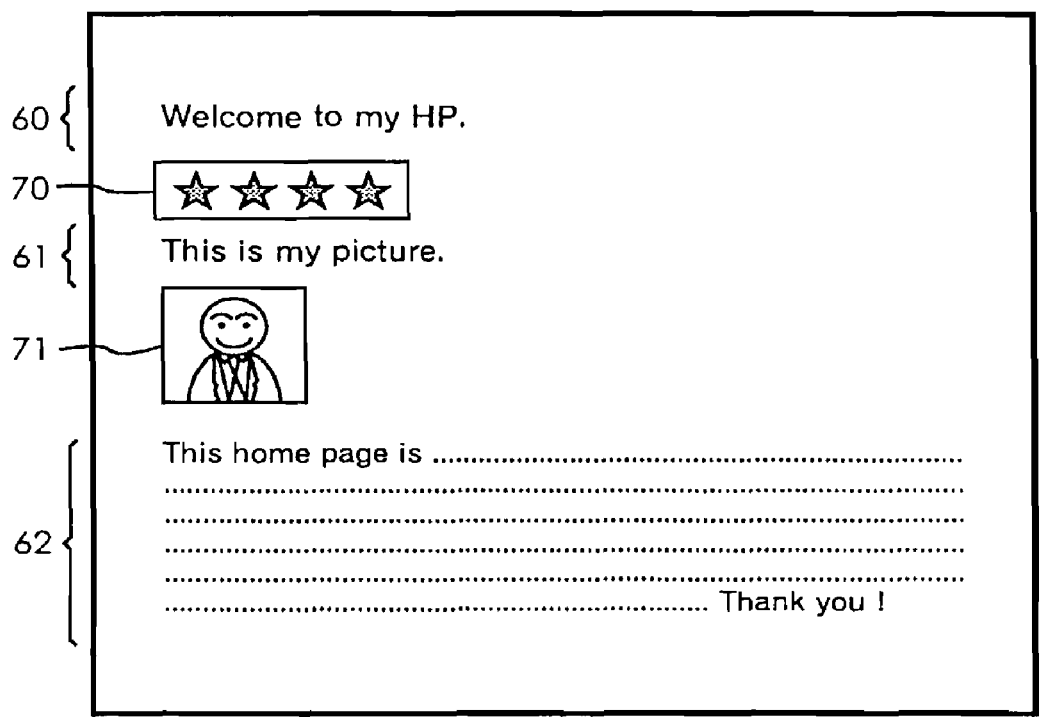
FIG. 3 is a diagram showing an example web page a user desires to translate.
FIG. 4 is a diagram showing an example HTML document for displaying the web page in FIG. 3.

FIG. 3 shows an example web page for translation. The web page in FIG. 3 can be displayed by the browser 10 based on the HTML document 21 (or the HTML document 38), which can be downloaded from the web server 20 (or the translation service server 30). This web page includes, as text portions, original language, English sentences 60, 61 and 62, and images 70 and 71. In this embodiment, an explanation will be given for an example wherein the original language, English sentences 60, 61 and 62 are translated into a target language, Japanese.

At step S101, data designating English as the original language and Japanese as the target language can be transmitted with the URL to the translation service server 30. At this time, the display mode designated by the display mode switching unit 13 can also be transmitted. The display mode in this case is the mode for specifying the display state for the results display unit 14, so that either only the translation is displayed or both the original and the translation are displayed as the result of the translation process, and the user can designate an arbitrary display mode. It should be noted, however, that the display mode sitching unit 13 may not be provided for the HTML document display controller 11, and the selection of the display mode by the user may not be performed.

Upon receiving the results obtained by the browser 10, the transmitter/receiver 31 of the translation service server 30 receives the translation request from the browser 10 (step S301). Specifically, the transmitter/receiver 31 of the translation service server 30 receives, via the Internet, a translation request designating the URL of a web page to be translated, an original language, a target language and a display mode. Then, the HTML document acquisition unit 33 of the translation service server 30 obtains, from either the internal storage device or the web server 20, the HTML document (the HTML document 38 or the HTML document 21) for displaying a web page at the designated URL. The HTML document analyzer 34 extracts, from the web page represented by the HTML document, portions (hereinafter referred to as text portions) for the display of a sentence, and the HTML document translation processor 36 transmits the text portions to the translation engine 40 (step S302).

FIG. 4 is a diagram showing an example HTML document 21 or 38 for displaying the web page in FIG. 3. At step S302, lines 63, 64 and 65, beginning at <H1> and <P> in FIG. 4, are transmitted to the translation engine 40 as HTMLs corresponding to the sentences 60, 61 and 62, the text portions in FIG. 3. It should be noted that at step S302, data designating English as the original language and Japanese as the target language are transmitted to the translation engine 40 along with the lines 63, 64 and 65.

The translation engine 40 receives from the translation service server 30 the lines 63, 64 and 65, which are the text portions of the HTML document 21 or 38, and begins the translation of the text portions based on the designated languages (step S401). The translation process is performed when the CPU of the translator 41 interacts with the main memory, and executes the translation program based on the data stored in the dictionary recording unit 42 for the words and grammar rules. The translation program used in this process is not specifically limited, and a program based, for example, on morphological analysis, syntax analysis, syntax generation or translation generation may be employed. Since for the subject of the present invention the translation process at step S401 is not essential, a detailed explanation will not be given. Also, the translation algorithm and the output form of the translation are not specifically limited.

In this embodiment, the translation service server 30 transmits the text portions of the HTML document 21 or 38 to the translation engine 40; however, the translation service server 30 may instead transmit the HTML document 21 or 38 to the translation engine 40 unchanged, and the translation engine 40 may both extract and translate the text portions.

After the text portions have been transmitted, the HTML document analyzer 34 of the translation service server 30 further analyzes the HTML document 21 or 38 obtained at step S302 and extracts the included image tags (step S303). Specifically, lines 72 and 83, for each of which image tags, <IMG src=...>, are indicated, are extracted from the HTML document in FIG. 4. In the image tags, a file name following the "src=" is to be displayed as an image, and in this embodiment, images based on files "image_1.gif" and "image_2.gif", which are respectively stored at the same locations as the HTML documents 21 and 38, are to be displayed on a web page.

For the translation of the HTML documents, the image tags are stored in the web server 20 with the HTML document 21 or 38, and when a full URL name is not used to designate a storage location, i.e., when designation is not specified like IMG src=http://..., the image tags are changed in order to specify that the storage location for an image designated by the image tags is within the web server 20. This change will be described in detail later.

Next, the translation service server 30 prepares a results HTML document. That is, the image tag processor 35 of the translation service server 30 generates dummy tags based on extracted image tags, and generates an incomplete results HTML document in which the dummy tags are inserted immediately following the header (step S304). This results HTML document is used to display the translated web page on the browser 10. The incomplete results HTML document is generated because the translation engine 40 has not yet completed the translation process and obtained the translated text data, and a completed results HTML document can not be generated.

FIG. 5 is a diagram showing an example results HTML document generated at step S304. At step S304, portion (i) is generated because the translation results have not been obtained from the translation engine 40. In FIG. 5, lines 75 and 76, located immediately following a header 74, are dummy tags that serve substantially the same purpose as do the lines 72 and 73. The dummy tags are generated and inserted into the results HTML document so that the browser 10 can obtain in advance the image data designated by the image tags, while the translation engine 40 is translating the text portions.

Images 70 and 71 in FIG. 3, which have predetermined sizes, are drawn on the web page by lines 72 and 73 in FIG. 4, which are image tags. The dummy tags inserted into the results HTML document are those entered merely to start the process for obtaining image data in advance, and images for them need not be displayed. For if the images for the dummy tags were displayed, the layout of the translated web page would be destroyed. Thus, as is indicated by the lines 75 and 76 for the dummy tags in FIG. 5, the sizes of the images "image_1.gif" and "image_2.gif", designated by the tags, are set as "width=0 height=0", i.e., widths and heights of 0 (size 0) are designated, so that when the browser 10 receives the lines 75 and 76, which are the dummy tags, the display of images based on the image files designated by the lines 75 and 76 is inhibited.

The transmitter/receiver 31 of the translation service server 30 begins to transmit to the browser 10 the incomplete results HTML document generated by the translation results processor 37 (step S305). At step S305, since the translation engine 40 has not yet completely translated the text portions, the portion in FIG. 5 from the header 74 to the dummy tag on the line 76, i.e., only the HTML document for the portion (i), is generated. Thus, at step S305 the HTML document for the portion (i) is transmitted.

The browser 10 receives the results HTML document from the translation service server 30, and starts the rendering process for displaying a web page based on the HTML document for the results display unit 14 (step S102). In this embodiment, the portion (i) in FIG. 5, extending from the header 74 to the line 76 for the dummy tag, is received, and the processing is begun based on that portion. Then, since the results HTML document includes image tags, the browser 10 employs the image tags to transmit a request to the translation service server 30 or the web server 20 to obtain the image data (step S103). Further, since at this time the browser 10 cannot receive the remainder of the results HTML document following the portion (i), the browser 10 halts the rendering process for displaying a web page based on the results HTML document, and waits to receive the remainder of the results HTML document.

The transmitter/receiver 31 of the translation service server 30 receives the image data request from the browser 10 (step S306). In this embodiment, the processing performed for the HTML document 38 is explained; however, for the translation of the HTML document 21, the browser 10 obtains image data directly from the web server 20. Based on the image data request, the translation service server 30 obtains image data from the internal storage device, and transmits the image data to the browser 10 (step S307). In the example in FIG. 4, since the image tags on the lines 72 and 73 in the HTML document 21 or the HTML document 38 do not specifically designate an image data storage location, the image data are stored with the HTML document 21 or 38 in the web server 20 or the translation service server 30.

The browser 10 receives image data from either the translation service server 30 or the web server 20 (step S104). The image data received by the browser 10 are based on the lines 75 and 76 in FIG. 5, the dummy tags, and as is described above, the sizes of the images designated by the dummy tags are set to 0. Therefore, when the browser 10 has obtained the image data, it does not display them on the results display unit 14, but instead, stores them in the cache unit 15, which is the temporary data storage unit.

When the translation engine 40 has completed the translation of the text portions, the translation engine 40 transmits the obtained translation to the translation service server 30 (step S402). And thereafter, the translation engine 40 terminates the processing.

The HTML document translation processor 36 of the translation service server 30 receives the resultant translation from the translation engine 40 (step S308), and the translation results processor 37 adds the received translation to the HTML document 21 or 38 to complete the HTML document, which was incompletely generated at step S304. Then, the transmitter/receiver 31 transmits to the browser 10 the remaining portion of the results HTML document, which was partially transmitted at step S305 (step S309).

At step S309, the lines 63, 64 and 65, which are the text portions of the HTML document 21 or 38 in FIG. 4, are replaced with their translations, so that the portion (ii) of the results HTML document in FIG. 5 is coupled with the portion (i) and a sequential document is generated. In portion (ii), as well as in the HTML document 21 or 38, the lines 72 and 73, which are image tags, are included between the Japanese translations corresponding to the lines 63, 64 and 65, and thus, the translated HTML document is obtained. That is, as is shown in the results HTML document in FIG. 5, the dummy tags are inserted in the portion (i), the first portion of the translated HTML document, that previously was transmitted at step S305. And at step S309, the translation service server 30 transmits the portion (ii), the remainder of the HTML document. Thereafter, the translation service server 30 terminates the processing.

The browser 10 receives the results HTML document from the translation service server 30, and based on the results HTML document, performs the rendering process (step S105) and thereafter terminates the processing. Since at step S102 the browser 10 has already received the portion (i) of the results HTML document in FIG. 5, at step S105 it receives only the portion (ii). Then, based on the HTML of the portion (ii), the browser 10 performs the rendering process to display the translated web page on the results display unit 14.

In the rendering process at step S105, since the portion (ii) includes the lines 72 and 73, which are image tags, the browser 10 obtains image data based on the lines, and during this process, the browser 10 first determines whether the image data are present in the cache unit 15. When the image data are not present in the cache unit 15, generally, the browser 10 issues a request directed to the location whereat the image data are stored, and obtains the image data. When, however, the image data are present in the cache unit 15, the browser 10 obtains the image data from the cache unit 15.

In this embodiment, the image data designated by the lines 72 and 73 have already been obtained at step S104, based on the lines 75 and 76, which are dummy tags, and are stored in the cache unit 15. Therefore, during the rendering process at step S105, since the image data stored in the cache unit 15 can be employed as image data designated by the lines 72 and 73, new image data need not be obtained from an external server when the portion (ii) is analyzed. That is, the display of the results HTML document is not delayed until image data is obtained, and the web page in FIG. 6, based on the results HTML document in FIG. 5, can be displayed within a short period of time on the results display unit 14. It should be noted that the Japanese sentences corresponding to the English sentences on the lines 60, 61 and 62 in FIG. 3 are presented on the lines 65, 66 and 67 in FIG. 6, and the images 70 and 71, based on the lines 72 and 73 in FIG. 4, are inserted between the lines 65, 66 and 67.

A more realistic scenario for the processing of this invention will be specifically explained while taking the image data storage location into account. For the convenience of the explanation, the following definitions are employed.

The host name of the translation service server:
www.service.com
the host name of the web server on the Internet:
www.external.com
the HTML document in FIG. 4:
sample.htm
(1) When all of sample.htm, image_1.gif and image_2.gif are present in www.service.com:

(A) The browser transmits to www.service.com the translation request for http://www/service.com/sample.htm.
(B) The translation service server obtains the request for sample.htm at www.service.com (by itself), and transmits dummy tags in FIG. 7 to the browser.
(C) The browser transmits the requests for image_1.gif and image_2.gif to www.service.com.
(D) Since image_1.gif and image_2.gif are present in the machine at www.service.com, www.service.com transmits these data to the browser.

(2) When all of sample.htm, image_1.gif and image_2.gif are present in www.external.com:
(A) The browser transmits to www.service.com the translation request for http://www.external.com/sample.htm.
(B) The translation service server obtains sample.htm by issuing the request for sample.htm to www.external.com, and transmits the dummy tags in FIG. 7 to the browser.
(C) The browser transmits the requests for image_1.gif and image_2.gif to www.service.com.
(D) Since image_1.gif and image_2.gif are not present in the machine at www.service.com, www.service.com transmits an error message to the browser.

In order to not return an error message at (D) in (2), the relative description concerning the location of image data must be modified. For example, when the dummy tags are returned at (B), the original HTML document is rewritten and modified as follows.

```
<HTML>
<BODY>
<IMG src="http://www.external.com/image_1.gif" width ...
<IMG src="http://www.external.com/image_2.gif" width ...
<H1>
<IMG src="http://www.external.com/image_1.gif">
....
<IMG src="http://www.external.com/image_1.gif">
</BODY>
</HTML>
```

Since in this manner "src's" for all the image tags are rewritten by using the URLS, including the host names, whereat the src are present, the browser can issue an image acquisition request to the web server whereat the image data are present.

As is described above, according to the translation system of this embodiment, the translation service server 30 starts the translation of the text portions, extracts the image tags from the HTML document for a web page to be translated, and transmits the image tags to the browser 10. The browser 10 then obtains the image tags in advance, acquires the image data based on these image tags, and employs the image data to display the translated web page on the results display unit 14. As a result, new image data need not be obtained when the translated web page is displayed. In this embodiment, the image data is obtained in advance during a period in which the translation engine 40 is translating the text, i.e., in which conventionally the system is only waiting until the translated web page is obtained. Therefore, when the translated web page is displayed, a process for which an extended period of time is required to obtain image data need not be performed, and as a result, the time required to display the translated web page on the results display unit 14 can be reduced.

In this embodiment, depending on the type of browser 10 employed by a user, the locations in the results HTML document in FIG. 5 whereat the dummy tags are present may become the blank lines in a pertinent portion 80 of the translated web page in FIG. 6. And when a program written in a language such as JavaScript is employed for the dummy tags, a countermeasure can be employed to prevent the translated web page from differing from the layout of the original web page due to the generation of these blank lines.

FIG. 7 shows an HTML document including example dummy tags used to eliminate blank lines from a web page based on the results HTML document. The dummy tags in FIG. 7 are shown on lines 78 and 79, and when the size of image data is specified as "width=0 height=0", "'onLoad="document.body.removeChild(this)"' is set. Then, when the image data has been obtained, the process for deleting the lines for the dummy tags is performed, so that the blank lines can be eliminated. In FIG. 7, the program for removing the blank lines is not limited to this, and can be adjusted as needed.

In the translation process for this embodiment, the English text is translated into Japanese; however, the employment of the present invention is not thereby limited, and it can also be applied for the translation of English into German, or the translation of a language other than these into another language.

In this embodiment, the browser completes the reception of image data by the time the browser 10 has obtained, through the translation service server 30, the translation from the translation engine 40. However, the present invention is not limited to this. So long as the browser 10 begins the process for obtaining image data during the waiting period before the translation is obtained, the period required for the acquisition of image data to be completed is reduced when compared with the time required for the conventional method, according to which image data is obtained after the translation is acquired. Therefore, the time required for the display of the results HTML document can be reduced.

In this embodiment, the translation service server 30 transmits a request to the translation engine 40 for the translation process and then extracts the image tags and transmits them to the browser 10. However, the translation service server 30 may first extract image tags and transmit them to the browser 10, and thereafter issue a translation request to the translation engine 40.

Further, in this embodiment the computer, which is the client employed by a user, performs no translation, and the translation process is performed by the translation service server 30 and the translation engine 40. However, the present invention is not limited to this. For example, a processor serving as the translation service unit of the translation service server 30 need only be provided for the computer serving as the client machine. And also, although the computer performs the image data acquisition process in parallel to the translation, this function may be provided for the browser 10 program.

The program installed in the translation service server 30, the browser 10 or the computer serving as the client machine, for performing a process in the embodiment, can also be implemented as a storage medium. That is, a computer-readable program that permits the computer to perform the above described processes need only be stored on a storage medium, such as a CD-ROM, a DVD, a memory or a hard disk.

In addition, in this embodiment, before the acquisition of the translation is completed, data based on the image tags are extracted and transmitted to the browser 10. However, the tags extracted in advance and transmitted to the browser 10 are not always image tags. For example, these tags need only be data that are obtained and stored in advance in the cache unit 15 by the browser 10, and can be employed to represent the translated web page, and, for example, tags for displaying moving pictures. Furthermore, tags for generating sounds can be employed.

Moreover, without departing from the subject of the invention, the configuration for this embodiment may be selectively modified, or can be changed into another configuration.

As is described above, according to the present invention, the translation of a web page can be displayed within a short period of time.

What is claimed:

1. A computer connected to a network comprising:
   an acquisition unit adapted to obtain document data across the network;
   an extraction unit adapted to extract from the document data instruction data, comprising dummy tags, instructing the acquisition of predetermined data stored separately from the document data;
   a translation acquisition unit adapted to translate text of the document data to obtain translation data;
   an instruction unit adapted to, before the translation acquisition unit completes the acquisition of the translation data, instruct the start of the acquisition of the predetermined data designated by the instruction data; and
   a display unit adapted to display a translation based on the translation data and an image based on image data, wherein the display unit can inhibit the image display until the translation data is obtained, wherein
   the predetermined data is image data.

2. A server for translating text data of electronic data, the server comprising:
   an electronic data acquisition unit adapted to obtain electronic data, including text data, display mode, and image acquisition data;
   a data extraction unit adapted to extract from the electronic data the image acquisition data, comprising dummy tags, as prior acquisition data for acquiring images first;
   a translated text data acquisition unit adapted to translate the text data in the electronic data and obtaining translated text data;
   a display data generator adapted to generate display data based on the prior acquisition data and the translated electronic data, including the translated text data, display mode, and the image acquisition data; and
   a transmitter adapted to transmit to a client, across a network, the generated display data in the prior acquisition data and the translated electronic data order, wherein
   the extracted, prior acquisition data is transmitted to the client before the translated text data acquisition unit obtains the translated text data.

3. The server of claim 2, wherein
   the display data generator adds, to the display data, storage instruction data for storing, in the client, image data obtained according to the prior acquisition data.

4. A translation method comprising the steps of:
   obtaining original document data to display an original document on a computer;
   examining the original document data for the presence of saved data;
   when the saved data is present, generating instruction data, comprising dummy tags, for instructing the acquisition of the saved data, and transmitting the instruction data to a client across a network;
   obtaining translation data for the original document;
   transmitting the obtained translation data to the client across the network; and
   permitting the client to initiate the acquisition of the saved data in accordance with the instruction data, before the translation data is acquired.

5. The translation method of claim 4, further comprising:
   before examining for the presence of the saved data, instructing the acquisition for the translation data of the original document.

6. The translation method of claim 4, wherein
   the instruction and the translation data is transmitted to the client as a coupled document data series.

7. The translation method of claim 4, further comprising:
   based on the instruction data, storing the saved data in a storage device in the client.

8. A method, performed within and by a translation server, comprising:
   receiving, from a client, a translation request to translate an original document;
   transmit a partial portion of the original document or the complete original document to a translation engine;
   extract image data from the original document;
   returning, after extracting the image data and before receiving translation data from the translation engine, an incomplete portion of a results document to the client; and
   returning, after receiving the translation data from the translation engine, a remaining portion of the results document to the client, wherein
   the incomplete portion of the results document includes dummy tags based upon image tags extracted from the original document.

9. The method of claim 8, further comprising:
   receiving, from the client, an image request based upon the incomplete portion of the results document returned to the client; and
   transmitting, to the client and based upon the image request, image data.

10. The method of claim 8, wherein
    the image data within the original document is not transmitted to the client before the translation server terminates processing of the translation request.

11. The method of claim 8, wherein
    the remaining portion of the results document includes the translation data.

* * * * *